Oct. 4, 1960     W. F. JACKSON     2,954,696
INSULATED THERMAL ELEMENT
Filed Jan. 4, 1957

INVENTOR.
*Wilbur F. Jackson.*
BY
*Albert J. Henderson*
HIS ATTORNEY.

United States Patent Office 2,954,696
Patented Oct. 4, 1960

2,954,696

INSULATED THERMAL ELEMENT

Wilbur F. Jackson, Compton, Calif., assignor to Robertshaw-Fulton Controls Company, Richmond, Va., a corporation of Delaware Filed Jan. 4, 1957, Ser. No. 632,444

3 Claims. (Cl. 73—362.3)

This invention relates to thermostatic control devices and more particularly to a new and improved thermally responsive element utilized in heating appliances and the like to control the operation of such appliances.

Automatic operation of a heating appliance, for example, a water heater, is accomplished by means of a control mechanism operable in response to a thermostat having a thermal element which extends into the water tank of the water heater. Variations in the temperature of the water result in a corresponding expansion or contraction of the thermal element which operates the control mechanism. Prior to this invention, the life of a water tank was considerably lessened by electrochemical action between the dissimilar metals of the water tank and the thermostat. A galvanic circuit was established between the water tank and the thermostat or its shank assembly and was completed through the water with the result that galvanic corrosion increased deterioration of the water tank.

It is an object of this invention to eliminate the possibility of a galvanic circuit in a heating appliance by isolating hte thermostatic means from the appliance.

It is another object of this invention to mount a rod and tube type thermostat in a heating appliance in such a manner that the mounting assembly is insulated from the thermal element.

A further object of this invention is to mount a rod and tube type thermostat in a heating appliance and to insulate the rod element from the tube element so that no electro-chemical circuit can be established therebetween.

This invention has a further object in the prevention of galvanic corrosion in a water heater having a thermostatic control.

Figure 1:
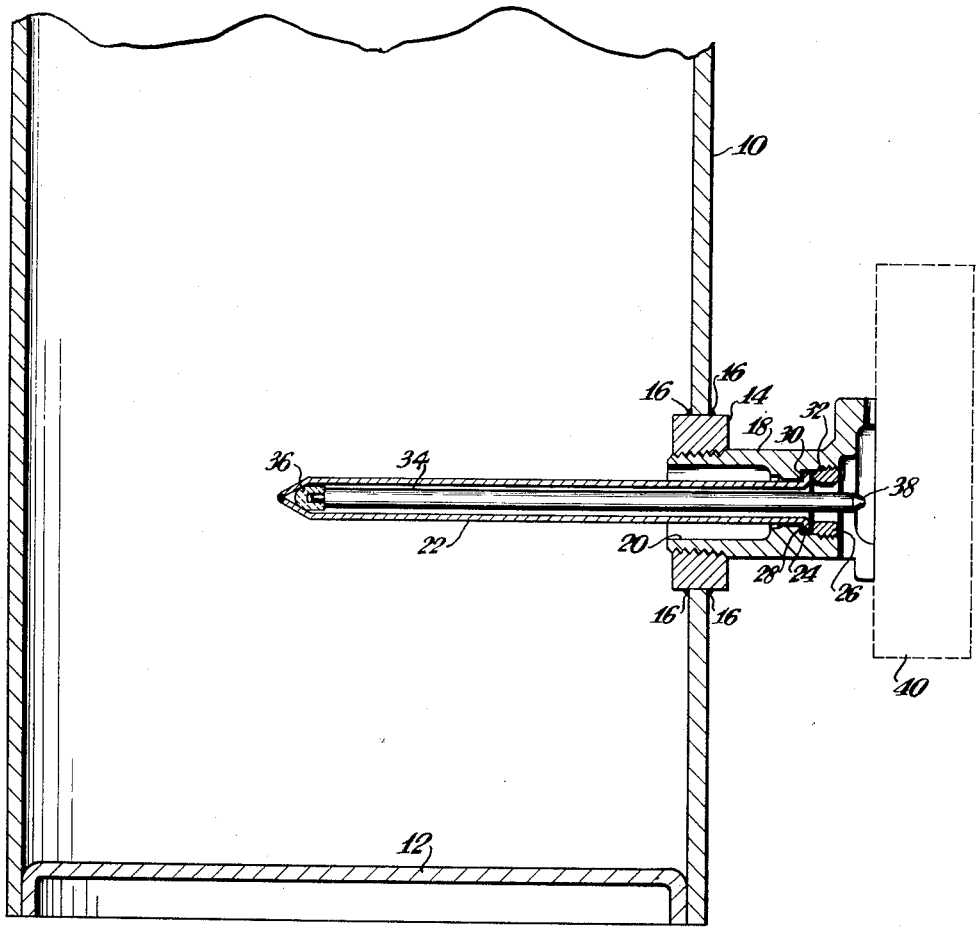
Figure 2:
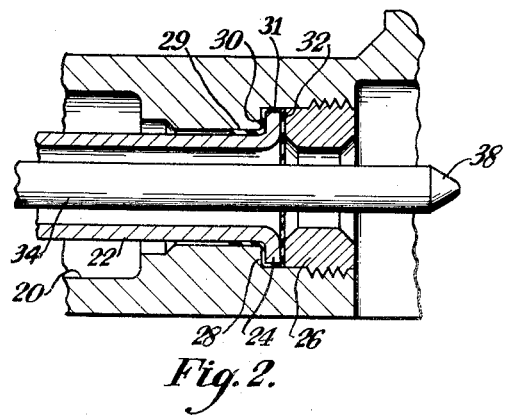

Other objects and advantages of this invention will become apparent from the following description when considered in connection with the accompanying drawing wherein:

Fig. 1 is a longitudinal section of a portion of a water tank with a thermostatic control device mounted thereon; and Fig. 2 is an enlarged view of the mounting shown in Fig. 1.

It is to be understood that this invention is capable of being incorporated in many types of heating appliances but for the purposes of description it is being presented as applied to a water heating appliance.

The invention is shown in Fig. 1 as employed in connection with a water heater tank 10 having a cylindrical body supported by a base 12. An opening in the wall of the tank is provided with a nut 14 secured thereto by any suitable means such as brazing or welding 16. An assembly shank 18 has one end threaded into nut 14 while its opposite end projects outside of the tank 10, and a center bore 20 in shank 18 establishes communication between the inside and the outside of the tank 10.

A hollow tube 22, fabricated from a highly expansible metal such as copper, has a closed end projecting into the water tank 10 while its opposite end is open and projects into center bore 20 for rigid attachment to shank 18. An annular flange 24 on the open end of hollow tube 22 is disposed between a hollow lock bushing 26 threaded into the exposed end of the shank center bore 20 and an annular abutment 28 internally formed on shank 18 and extending radially into the center bore 20. An annular insulating sleeve 30 has a skirt portion 29 and an enlarged cupped portion 31. The cupped portion 31 receives the underside and outer edge of flange 24 while the skirt portions 29 extends for a short distance along the tube 22. Thus, the sleeve 30 isolates the tube 22 and its flange 24 from abutment 28 and shank 18. An insulating washer 32, disposed between the outer end surface of flange 24 and lock bushing 26, completes the isolation of tube 22 from shank 18. Insulating sleeve and washer 30 and 32 may be fabricated as an integral unit, depending upon the most convenient and economical method of manufacture.

A relatively non-expansibe rod 34, such as an Invar rod, is suspended within the hollow tube 22 and extends through the shank center bore 20. One end of rod 34 is attached to an end washer 36, fabricated from an inflexible insulating material such as a ceramic material. End washer 36 is disposed adjacent the closed end of tube 22 so that rod 34 and tube 22 are concentrically mounted.

The rod 34 has a greater longitudinal dimension than tube 22 so that its exposed end 38 abuts a clicker disc mechanism, indicated generally at 40, which is well known in the art. The mechanism 40 is attached to the exposed end of assembly shank 18 in such a manner that one end of the Invar rod 34 is supported in the end washer 36 and its exposed end 38 engages the mechanism 40. It is to be understood that the mechanism 40 includes control means actuated by rod 34 to control the transfer of energy to a heating unit for the water tank 10.

In assembling this device, the closed end of tube 22 is projected into the water heater 10 and the open end thereof is disposed within the center bore 20 where it is attached to shank 18 by positioning the attaching flange 24 between abutment 28 and hollow lock bushing 26. Bushing 26 causes flange 24 to be fastened to abutment 28.

In operation, rod 34 is free to float between the closed end of tube 22 and the mechanism 40. The differential in the contraction of rod 34 and tube 22 under a demand for heat in the water in which the device is mounted causes the longitudinal movement of rod 34 so that, with one end of rod 34 confined in end washer 36, the free end 38 applies pressure on mechanism 40 to actuate the control means whereby energy is supplied to the heating unit. As the demand for heat is satisfied, the copper tube 22 expands allowing the free floating Invar rod 34 to move and release the pressure on mechanism 40 so that the supply of energy to the heating unit is cut off.

Inasmuch as the end washer 36 insulates Invar rod 34 from copper tube 22, the possibility of a galvanic circuit being established through rod 34 is eliminated. Nor can a galvanic circuit be established through tube 22 since insulating sleeve and washer 30 and 32 isolate the tube 22 from the assembly shank 18.

Inasmuch as this invention is subject to many variations and modifications, it is intended that all matter contained in the above description of the embodiment shown herein shall be interpreted as illustrative and not in a limiting sense.

What is claimed is:

1. A thermal element in combination with a thermal element mounting for a water heater having a mounting aperture, said mounting comprising a metallic shank adapted to be rigidly fastened to the water heater and having a center bore, an abutment extending from a wall of the center bore, fastening means disposed axially in the center bore to cooperate with said abutment, said thermal element being formed of metal dissimilar to said metallic shank and comprising a rod disposed within a hollow tube and spaced from the inner wall thereof, said hollow tube having a closed end adapted to project into the water heater and an open end disposed within the center bore, an insulating member between said closed end and the adjacent end of said rod for supporting said rod, an attachment portion on the open end of said tube positioned between said abutment and said fastening means, and insulating means disposed within said center bore in contact with said abutment and said fastening means to break a galvanic circuit between said thermal element and said mounting.

2. The combination as recited in claim 1 wherein said insulating means comprises insulating sleeve and washer means disposed between said abutment and contiguous surfaces of said tube and its attachment portion, and an insulating washer disposed between said fastening means and contiguous surfaces of said attachment portion.

3. In combination, a thermostat and a mounting assembly for supporting said thermostat on a hot water heater tank having a mounting aperture comprising a nut adapted to be rigidly secured to the wall of said aperture, a shank having external threads on one end to engage said nut, said shank having a center bore being internally threaded in its end adjacent the opposite end of said shank, a hollow lock bushing engaging the internally threaded end of the center bore, an internal annular abutment intermediately positioned on said shank and extending radially inwardly from a wall of the center bore, a metallic expansible hollow tube having a closed end and an open end, an annular flange on said open end axially disposed in the center bore between said abutment and said lock bushing whereby said tube is rigidly attached to said shank in the center bore, insulating means including a sleeve portion disposed between contiguous surfaces of said abutment and said flange to isolate said tube from said shank and a washer portion disposed between contiguous surfaces of said lock bushing and said flange to isolate said tube from said lock bushing, a rod of relatively non-expansible metal extending through said bushing and said tube and spaced from the inner walls thereof, and an inflexible insulating end washer carried on one end of said rod and being disposed in said tube adjacent its closed end whereby said rod is supported and isolated from said tube.

References Cited in the file of this patent

UNITED STATES PATENTS

| | | |
|---|---|---|
| 764,603 | Lambert | July 12, 1904 |
| 1,024,729 | Lawler | Apr. 30, 1912 |
| 1,726,675 | Morris | Sept. 3, 1929 |
| 2,618,722 | De Witt | Nov. 18, 1952 |
| 2,803,495 | Ray | Aug. 20, 1957 |